United States Patent Office 3,284,303
Patented Nov. 8, 1966

3,284,303
ORALLY ACTIVE PROGESTERONE
COMPOSITIONS
Albert Meli, East Orange, N.J., assignor to Warner-Lambert Pharmaceutical Company, Morris Plains, N.J., a corporation of Delaware
No Drawing. Filed Nov. 14, 1963, Ser. No. 323,608
2 Claims. (Cl. 167—74)

This invention relates to a composition of matter. More particularly, this invention relates to an orally active therapeutic composition containing progesterone and to the use of said composition.

Progesterone is a steroid hormone represented structurally by the formula:

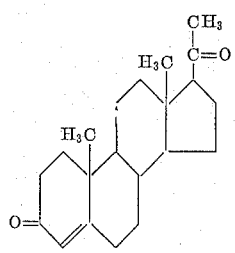

It is secreted by the corpus luteum of the ovary, and during pregnancy is secreted by the placenta. The primary biologic function of progesterone is directed towards the preparation of the uterus for reception of the fertilized ovum and for maintenance of conditions favorable for pregnancy. Hypoprogesteronism, therefore, leads to those clinical manifestations such as habitual abortion, functional uterine bleeding, dysmenorrhea, amenorrhea and so on. One aspect of the treatment or prevention of these conditions comprises the administration of progesterone. Although progesterone when taken orally seems to be well absorbed from the small intestine, there is relatively little progestational activity observed. This is believed to be due in part to: (a) hepatic inactivation and (b) the short biologic half-life of progesterone in the blood. For these reasons, it is usually administered by injection intramuscularly as a solution or suspension in an aqueous or fatty vehicle, administration being either daily or slightly less frequently. The daily intramuscular injection of progesterone has many disadvantages. For example, the discomfort experienced by the patient, the care necessary for the maintenance of sterility of the drug and the hypodermic syringe, and the frequent need for professional help in giving the injection all add materially to the difficulties of maintaining adequate progesterone therapy.

Because of the foregoing, it is apparent that there is a real need for a progesterone composition which is active on oral administration.

Accordingly, a primary object of this invention is to provide an orally effective therapeutic composition containing progesterone.

Yet another object of this invention is to provide a desired level of progestational activity by the oral administration of the progesterone composition of this invention.

Other objects of this invention will become apparent from the following detailed description.

The foregoing and additional objects have been accomplished by the provision of a composition comprising a solid solution of progesterone in glycerylmonostearate (GMS) which when administered orally to animals yields a significant progestational effect. Generally, the glycerylmonostearate of commerce is a mixture of fatty esters comprising glycerylmonostearate containing from about 45 to 55% by weight of glycerylmonopalmitate. This mixture has a melting point between 56° C. and 58° C. and a saponification value of 164 to 170 and is that mixture referred to hereinafter as glycerylmonostearate. Its principal use is as an auxiliary emulsifier in ointments and creams. The composition of the present invention is prepared by melting the glycerylmonostearate and adding the desired amount of progesterone to the molten liquid. The molten liquid mixture is then allowed to congeal while subject to constant stirring. The waxy product obtained may then be reduced to particles of any desired mesh size for incorporation into conventional oral dosage forms, such as tablets, capsules, finely-divided powders and the like. In a preferred embodiment of the present invention, the solution formed after the addition of progesterone to the glycerylmonostearate is passed through a centrifugal wheel atomizer rotating at a wheel speed of about 33,000 r.p.m. and the atomized spray formed is allowed to congeal in a closed chamber from which substantially uniform spherical particles of a diameter ranging from 20 to 200 microns are collected.

The ratio of glycerylmonostearate to progesterone is not critical in preparing the compositions of this invention. However, a ratio of 1 part progesterone to 9 parts of glycerylmonostearate is generally preferred. On oral administration a 50 mg. dose of the above composition containing 5 mg. of free progesterone has been observed to produce a significant progestational effect in immature female rabbits, a laboratory animal frequently employed in this test and whose reaction is recognized as indicating the progestational activity or lack of activity of steroid compounds.

In this test, the effect of progesterone is readily demonstrated by changes in the uterus of immature female rabbits, test animals which have been previously primed by the administration of estrogens. These changes include, for example, the change of the endometrium from a proliferative type to a secretory type. In a series of such tests, I have found that on oral administration progesterone in the form of a solution of progesterone in glycerylmonostearate is 3 to 6 times more potent than free progesterone administered via the same route. Thus, for example, a 15 mg. dose of free progesterone per animal/day is needed to produce the same degree of progestational activity as that produced by the administration of 5 mg. progesterone in solution in 45 mg. of glycerylmonostearate. This result is quite unexpected since it is well known that glycerylmonostearate does not possess progestational activity per se.

The compositions of the invention for oral use comprise the stated progesterone in glycerylmonostearate and such standard pharmaceutical excipients as are commonly used in the manufacture of oral formulations for humans and veterinary medication. They include, for example, solid compositions such as tablets, capsules, and pills, and dispersible powders or granules and semi-solid and liquid formulations in the form of pharmaceutically acceptable syrups, solutions and dispersions.

The said oral compositions may optionally contain other orally active hormones and more particularly those hormones known to possess an activity spectrum which will broaden the activity of the new compositions disclosed. These may include, for example, methyltestosterone for relief of pain from prostatic carcinoma.

The following examples illustrate the novel compositions of this invention and the enhanced progestational activity of progesterone in combination with glycerylmonostearate. The progesterone employed in said compositions is progesterone, U.S.P. XVI. It is to be understood that the invention is not limited to the examples

Example 1

To 900 grams of molten glyceryl monostearate melted at a temperature of about 70° to 75° C. is added 100 grams of progesterone and the mixture is stirred until a clear solution results.

The resulting solution is passed through a centrifugal wheel atomizer rotating at a speed of about 33,000 r.p.m. and the spray formed is solidified and collected in a closed chamber maintained at about 14° C. to 30° C. The congealed particles obtained are white, have a characteristic odor and contain about 10 mg. of free progesterone per 100 mg. of the finished product.

Example 2

The test for the determination of progestational activity is conducted according to the method of Clauberg (Zentr. Gynekol. 54: 2757, 1930) and McPhail (J. Physiol. 83: 145, 1934). Immature female rabbits weighing about 800 to 1000 grams each are employed. The animals are divided into two groups. One group is designated as "control" and the other "test." Each group of animals is primed with 5 mg. of estradiol subcutaneously for six consecutive days. On the 7th day, the control groups of animals receive a graded dose of progesterone orally. The test groups receive a graded dose of progesterone in glycerylmonostearate prepared in accordance with Example 1. The treatment for both groups is continued for 5 consecutive days together with 0.5 mg. of estradiol administered subcutaneously. On the 12th day, the rabbits are sacrificed and the uterus is removed. Cross-sections of the uterus are prepared, stained with hematoxylin and eosin and examined microscopically. The degree of progestational activity is determined according to the McPhail scale. The results obtained indicate that progesterone, U.S.P., administered orally at a dosage of 15 mg. per day produces the same progestational effect as the daily oral administration of 5 mg. of progesterone in combination with 45 mg. of glycerylmonostearate. The results observed by this test clearly establish the potent and enhanced effects of the composition of this invention.

It is to be understood that the foregoing detailed description is given merely by way of illustration and that many variations may be made therein without departing from the spirit of my invention.

Having described my invention, what I desire to secure by Letters Patent is:

1. An oral progestational composition comprising the combination of 1 part by weight of progesterone dissolved in about 9 parts by weight of glyceryl monostearate.

2. The method of producing progestational effects in a mammal which comprises administering orally, an effective amount of a composition as defined in claim 1.

References Cited by the Examiner
UNITED STATES PATENTS

| | | | |
|---|---|---|---|
| 2,965,541 | 12/1960 | Byrnes | 167—55 |
| 3,193,457 | 7/1965 | Kincl | 167—74 |

OTHER REFERENCES

United States Dispensatory, 24th ed., page 511, 1947.

JULIAN S. LEVITT, *Primary Examiner.*

LEROY B. RANDALL, *Assistant Examiner.*